United States Patent
Onishi et al.

(10) Patent No.: US 8,447,493 B2
(45) Date of Patent: May 21, 2013

(54) IGNITION TIMING CONTROLLER OF INTERNAL COMBUSTION ENGINE

(75) Inventors: Akito Onishi, Nagoya (JP); Takashi Yoshida, Nagoya (JP); Jun Aoki, Toyota (JP); Tomohiro Kisaku, Toyota (JP); Hiroto Tanaka, Toyota (JP); Rihito Kaneko, Miyoshi (JP); Kenji Senda, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 182 days.

(21) Appl. No.: 13/131,959

(22) PCT Filed: Nov. 20, 2009

(86) PCT No.: PCT/JP2009/070075
§ 371 (c)(1),
(2), (4) Date: Jun. 23, 2011

(87) PCT Pub. No.: WO2010/064589
PCT Pub. Date: Jun. 10, 2010

(65) Prior Publication Data
US 2011/0257865 A1    Oct. 20, 2011

(30) Foreign Application Priority Data
Dec. 2, 2008  (JP) ................... 2008-307778

(51) Int. Cl.
*F02P 5/152*    (2006.01)

(52) U.S. Cl.
USPC ............... 701/102; 123/406.21; 123/406.29; 123/406.3; 123/406.33

(58) Field of Classification Search
USPC ............ 701/102; 123/406.21, 406.29, 406.3, 123/406.33
See application file for complete search history.

(56) References Cited

U.S. PATENT DOCUMENTS 6,688,286 B2 * 2/2004 Kokubo et al. .......... 123/406.33
2002/0179053 A1 * 12/2002 Kokubo et al. .......... 123/406.33
(Continued)

FOREIGN PATENT DOCUMENTS

EP    1 985 831 A2    10/2008
GB    2 232 787 A     12/1990
(Continued)

OTHER PUBLICATIONS

International Search Report issued in International Application No. PCT/JP2009/070075 on May 11, 2010.
(Continued)

*Primary Examiner* — Erick Solis
(74) *Attorney, Agent, or Firm* — Oliff & Berridge, PLC (57) ABSTRACT

The apparatus of the present invention corrects a control target value of ignition timing using a multipoint learned value AGdp(n) for compensating for a change amount of the ignition timing caused by time-dependent change of the engine and a basic learned value AG(i) for compensating for a change amount of the ignition timing caused by a factor other than the aforementioned time-dependent change of the engine. In a multipoint learning range n in which the time-dependent change of the engine influences the ignition timing to a great extent, the control target is corrected using the multipoint learned value AGdp(n) and the basic learned value AG(i). In ranges other than the multipoint learning range n, the control target is corrected using only the basic learned value AG(i). Normally, only the learning of the multipoint learned value AGdp(n) is permitted in the multipoint learning range n, and only the learning of the basic learned value AG(i) is permitted in the ranges other than the multipoint learning range n. When it is determined that there is a possibility that fuel has been fed to a fuel tank, the learning of the multipoint learned value AGdp(n) is prohibited for a subsequent predetermined period (if NO in step S103 or step S104).

9 Claims, 6 Drawing Sheets

U.S. PATENT DOCUMENTS

2005/0005908 A1    1/2005   Tanei et al.
2008/0270005 A1   10/2008   Tooyama
2011/0303187 A1*  12/2011   Sasaki .................. 123/406.3

FOREIGN PATENT DOCUMENTS

| | | |
|---|---|---|
| JP | A-8-319877   | 12/1996 |
| JP | A-2004-76665 |  3/2004 |
| JP | A-2005-147112|  6/2005 |
| JP | A-2006-83734 |  3/2006 |
| JP | A-2007-92577 |  4/2007 |
| JP | A-2007-262941| 10/2007 |

OTHER PUBLICATIONS

Written Opinion of the International Searching Authority issued in International Application No. PCT/JP2009/070075 on May 11, 2010.

International Preliminary Report on Patentability issued in International Application No. PCT/JP2009/070075 on Apr. 27, 2011.

Japanese Office Action issued in Japanese Patent Application No. 2008-307778 on Jul. 5, 2011 (with translation).

* cited by examiner

IGNITION TIMING CONTROLLER OF INTERNAL COMBUSTION ENGINE

FIELD OF THE INVENTION

The present invention relates to an ignition timing controller of an internal combustion engine.

BACKGROUND OF THE INVENTION

In a vehicle having an internal combustion engine as a drive source, the ignition timing is controlled in accordance with the operating state of the engine. Basically, the ignition timing control involves setting a control target value for an ignition timing based on the operating state of the engine. The control target value is corrected using a feedback correction term that is updated depending on whether knocking has occurred. If knocking occurs, the feedback correction term is changed by the amount corresponding to a predetermined retardation update amount in order to retard the ignition timing. When knocking does not occur, the feedback correction term is changed by the amount corresponding to a predetermined advance update amount so as to advance the ignition timing. The control target is corrected using a learned value updated based on the feedback correction term. The learned value is, for example, a value obtained by performing a gradual change procedure on the feedback correction term.

For example, Patent Document 1 discloses a controller of an internal combustion engine that sets a first learned value and a second learned value. The first learned value is used for compensating for a change amount of the ignition timing caused by time-dependent change of the engine (which is, for example, deposit formation in the combustion chamber of the engine). The second learned value is used for compensating for a change amount of the ignition timing caused by a factor other than the aforementioned change of the engine (which is, for example, change of fuel properties).

In the controller described in Patent Document 1, learning of the first learned value is permitted in a first engine operating range, in which the deposit formation in the engine combustion chamber influences the ignition timing to a great extent. Contrastingly, such learning is prohibited in a second engine operating range, in which the influence of the deposit formation in the engine combustion chamber on the ignition timing is limited. As a result, a value corresponding to a change amount of the ignition timing caused by the aforementioned deposit formation is learned as the first learned value. Also, a value corresponding to a change amount of the ignition timing caused by a factor other than the deposit formation is learned as the second learned value. In this manner, the ignition timing is controlled in correspondence with factors causing knocking.

For example, high-octane gasoline may be fed to a fuel tank that has retained regular fuel. In this case, the fuel supplied to the engine has properties different from the properties of the originally retained fuel. In other words, when fuel having properties different from the properties of currently retained fuel is fed to the fuel tank, the fuel received by the engine has properties different from the properties of the currently retained fuel. In this case, the occurrence state of knocking changes, and the feedback correction term changes greatly.

In this case, if the learning of the first learned value is selectively permitted and prohibited simply in accordance with the operating state of the engine, the following problem may occur. Specifically, when the engine is operated in the first engine operating range immediately after refueling, the first learned value reflects the ignition timing (the feedback correction term) that has been greatly changed by the fuel having different properties. This hinders the first learned value and the second learned value from being accurately learned in correspondence with the target of compensation.

Patent Document 1: Japanese Laid-Open Patent Publication No. 2005-147112

SUMMARY OF THE INVENTION

Accordingly, it is an objective of the present invention to provide an ignition timing controller of an internal combustion engine capable of appropriately learning an engine ignition timing after refueling.

To achieve the foregoing objectives and in accordance with a first aspect of the present invention, an ignition timing controller of an internal combustion engine is provided. The controller sets a control target value of ignition timing by correcting a basic value set based on an operating state of the engine using a feedback correction term updated depending on whether knocking has occurred and a learned value updated based on the feedback correction term. The controller learns a first learned value and a second learned value separately. The first learned value compensates for a change amount of the ignition timing caused by time-dependent change that is caused when deposit forms in the engine, and the second learned value compensates for a change amount of the ignition timing caused by a factor other than the time-dependent change of the engine each as the learned value separately from each other. The controller includes setting means, permission means, determination means, and prohibition means. The setting means sets the control target value by correcting the basic value using the first learned value and the second learned value in a first engine operating range. The setting means sets the control target value by correcting the basic value using only the second learned value in a second engine operating range. The influence to the ignition timing due to the time-dependent change in the first engine operating range is greater than the influence to the ignition timing due to the time-dependent change in the second engine operating range. The permission means permits only learning of the first learned value in the first engine operating range, and permits only learning of the second learned value in the second engine operating range. The determination means determines whether there is a possibility that fuel has been fed to a fuel tank that retains fuel to be supplied to the engine. The prohibition means prohibits the learning of the first learned value for a predetermined period after the determination means determines that there is a possibility that fuel has been fed to the fuel tank.

By the above described configuration, if fuel having properties different from the properties of originally retained fuel is fed to the fuel tank, the learning of the first learned value is prohibited for a predetermined period of time in which the feedback correction term is greatly changed by the different properties of the fuel supplied to the engine. This prevents a change amount of the ignition timing caused by the fuel having different properties from being reflected in the first learned value. Further, since the learning of the second learned value is permitted at this stage, the change amount of the ignition timing caused by the fuel having different properties is reflected in the second learned value. Accordingly, the second learned value compensates for the change amount of the ignition timing caused by the fuel having different properties in the first engine operating range and the second engine operating range. Since the first learned value is learned in the first engine operating range after the predetermined period of time, a change amount of the ignition timing caused by time-dependent change of the engine is reflected in the first learned value if such change has occurred. The first learned value thus compensates for the change amount of the ignition timing caused by the time-dependent change of the engine. As a result, the engine ignition timing is appropriately learned after refueling.

In the above ignition timing controller, it is preferable that, when the prohibition means prohibits the learning of the first learned value, the second learned value be learned in the first engine operating range based on the feedback correction term.

By the above described configuration, compared to a configuration in which the learning of the second learned value is suspended for a predetermined period of time after the fuel having different properties has been fed to the fuel tank, the change amount of the ignition timing caused by the different properties of the fuel supplied to the engine is reflected in the second learned value at an early stage. The change amount of the ignition timing is thus compensated for with the second learned value at an early stage.

In the above ignition timing controller, it is preferable that the first engine operating range include a plurality of multipoint learning ranges that are defined in accordance with the operating state of the engine, the first learned value being set for each one of the multipoint learning ranges, and that the ignition timing controller update the first learned value of one of the multipoint learning ranges that includes the current engine operating state.

Time-dependent change of the engine, such as deposit formation in the combustion chamber, may influence knocking to greatly varied extents in segmented engine operating ranges. In this case, if the control target value is set using a common value as the first learned value for all of the engine operating ranges, the first learned value may become inappropriate for suppressing knocking caused by time-dependent change of the engine in some of the engine operating ranges. Specifically, the first learned value may become such a value that the ignition timing is advanced with respect to an optimal timing, thus hampering effective suppression of knocking. Alternatively, the first learned value may become such a value that the ignition timing is retarded with respect to the optimal timing, thus lowering the power output of the engine.

By the above described configuration, the first learned value, which is set for each one of the multipoint learning ranges segmented in the engine operating range in which the time-dependent change of the engine influences knocking to greatly varied extents, is learned as a value appropriate for suppressing knocking. This prevents the first learned value from being learned as an inappropriate value, thus effectively suppressing knocking and preventing decrease of the engine power output.

In the above ignition timing controller, it is preferable that, when the second learned value changes, the first learned value be changed by the amount corresponding to the change amount of the second learned value in the opposite direction to the changing direction of the second learned value.

When the engine operating range corresponds to the second engine operating range, the second learned value is updated and changed based on the feedback correction term. Afterwards, when the engine operating range is switched to the first engine operating range, the ignition timing (the control target value) is influenced and changed by the change of the second learned value. In this case, the ignition timing may become inappropriate for suppressing knocking or decrease the engine power output.

However, by the above described configuration, even when the engine operating range is switched to the first engine operating range after the second learned value has changed, the change of the second learned value does not influence the ignition timing. Accordingly, the ignition timing of the first engine operating range is prevented from becoming an inappropriate timing for suppressing knocking or from decreasing the engine power output due to the change of the second learned value in the second engine operating range.

In the above ignition timing controller, it is preferable that, on condition that a driving switch has been manipulated to start operation of the engine, the determination means determine that there is a possibility that fuel has been supplied to the fuel tank.

Normally, fuel is fed to the fuel tank with the engine maintained in a stopped state. In other words, it is likely that the fuel has been supplied to the fuel tank immediately before the engine is started. By the above described configuration, it is determined that there is a possibility that the fuel has been fed to the fuel tank when the engine is been started.

In the above ignition timing controller, it is preferable that, on condition that a storage battery is connected to an electric circuit for supplying power to the engine and peripheral devices of the engine, the determination means determine that there is a possibility that fuel has been fed to the fuel tank.

After the engine is repaired or inspected, fuel may be fed to the fuel tank. Normally, prior to such repair or inspection, the electric circuit for powering the engine and peripheral devices of the engine is disconnected from the storage battery. The electric circuit is reconnected to the storage battery after the repair or the inspection is completed. Accordingly, the fact that the storage battery has been connected to the electric circuit may indicate that there is a possibility that fuel has been fed to the fuel tank before or after such connection.

By the above described configuration, it is determined that there is a possibility that fuel has been supplied to the fuel tank when the storage battery has been connected to the electric circuit.

In the above ignition timing controller, it is preferable that the second learned value be updated by a learning procedure performed at predetermined cycles and stored in a volatile memory. In this case, when a driving switch has been manipulated to start operation of the engine or when a storage battery is connected to an electric circuit for supplying power to the engine and peripheral devices of the engine, the determination means determines that there is a possibility that fuel has been fed to the fuel tank. The predetermined period corresponds to a period until the number of manipulation of the driving switch to stop the operation of the engine reaches a predetermined number after it has been determined that the storage battery is connected to the electric circuit. After the number of manipulation of the driving switch to stop the operation of the engine has exceeded the predetermined number, the predetermined period corresponds to a period from when the driving switch is manipulated to start the operation of the engine to when the number of execution of the learning procedure reaches a predetermined number.

Once the electric circuit is disconnected from the storage battery, the second learned value, which has been learned as needed by that time, is deleted. Accordingly, after the electric circuit is reconnected to the storage battery, it takes a long tome before the second learned value is learned and becomes a value corresponding to the actual condition. However, if the driving switch is manipulated to switch between activation and deactivation of the engine with the electric circuit and the storage battery maintained as connected, the second learned value is stored in the volatile memory without being deleted.

This comparatively shortens the time necessary for the second learned value to be learned and become a value corresponding to the actual condition.

By the above described configuration, when the storage battery is connected to the electric circuit, or in other words, when it takes a long time to learn the second learned value, a long time is set as the predetermined period based on the time points at which the driving switch is manipulated to stop the engine, which are separated by long time intervals. Accordingly, the second learned value is learned preferentially for a long period of time. As a result, the value corresponding to the actual condition is accurately learned as the second learned value.

When the driving switch is manipulated to start the engine after the number of manipulations of the driving switch exceeds the predetermined number, or in other words, when it takes a comparatively short time to learn the second learned value, a short time is set as the predetermined period based on the time points at which the second learned value is updated, which are separated by short time intervals (cycles at which a learning procedure is carried out). Accordingly, the learning accuracy of the second learned value is maintained high and such preferential learning is accomplished at an early stage. As a result, the learning of the first learned value is started at an early stage.

In the above ignition timing controller, it is preferable that when a driving switch has been manipulated to start operation of the engine or when a storage battery is connected to an electric circuit for supplying power to the engine and peripheral devices of the engine, the determination means determines that there is a possibility that fuel has been fed to the fuel tank.

In the above ignition timing controller, it is preferable that the second learned value is updated by a learning procedure performed at predetermined cycles, wherein the predetermined period corresponds to a period until the number of manipulation of the driving switch to stop the operation of the engine reaches a predetermined number after it has been determined that the storage battery is connected to the electric circuit, and wherein after the number of manipulation of the driving switch to stop the operation of the engine has exceeded the predetermined number, the predetermined period corresponds to a period from when the driving switch is manipulated to start the operation of the engine to when the number of execution of the learning procedure reaches a predetermined number.

DESCRIPTION OF THE PREFERRED EMBODIMENTS

An embodiment of an ignition timing controller of an internal combustion engine according to the present invention will now be described.

Figure 1:
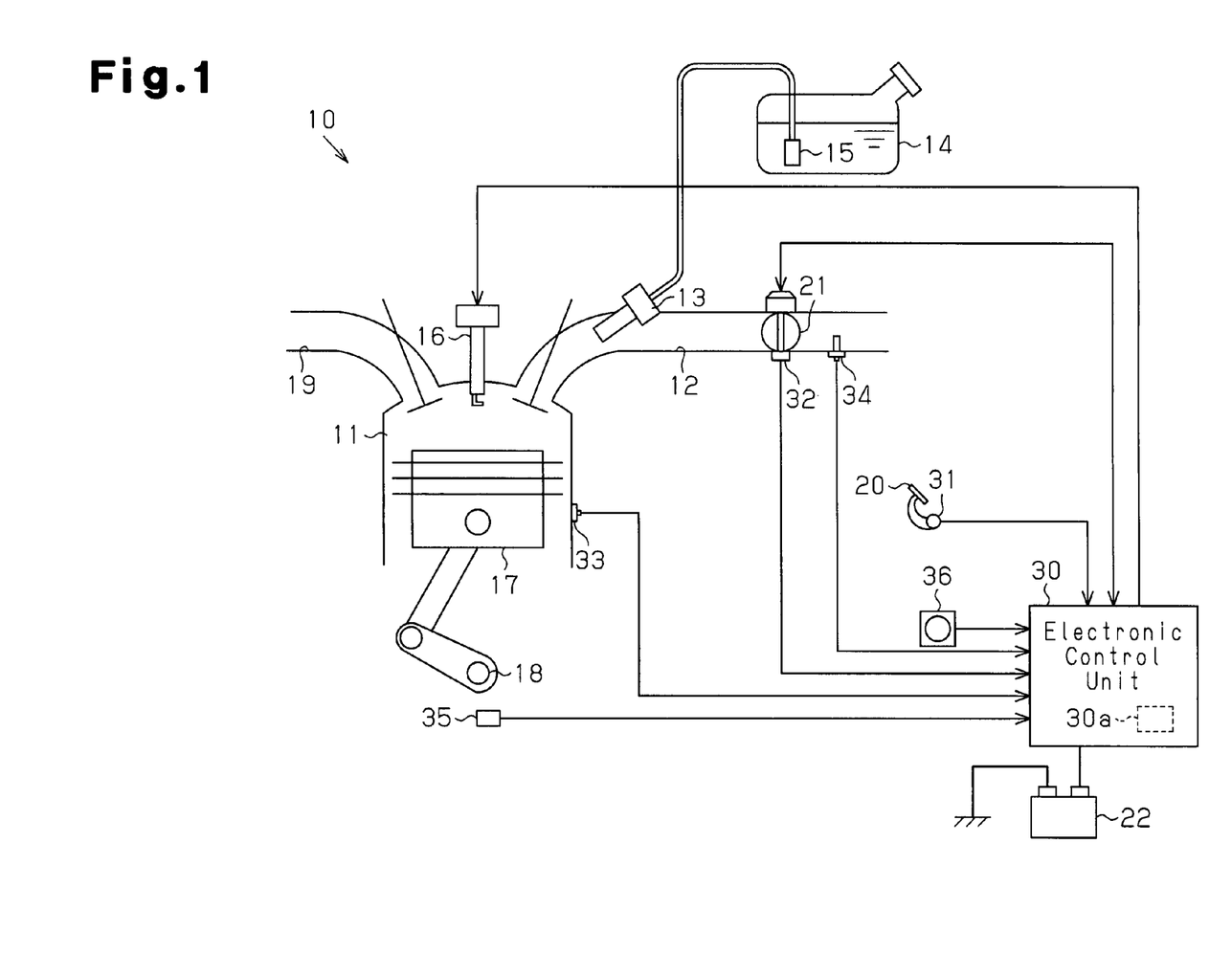
FIG. 1 is a diagram schematically showing an internal combustion engine employing an ignition timing controller according to one embodiment of the present invention.

As illustrated in FIG. 1, a combustion chamber 11 of an internal combustion engine 10 draws air through an intake passage 12 and receives fuel injected through a fuel injection valve 13. A fuel pump 15 sends fuel from the fuel tank 14, which retains the fuel, to the fuel injection valve 13 under pressure. A spark plug 16 then ignites the air-fuel mixture formed by the intake air and the injected fuel. When the air-fuel mixture burns, a piston 17 reciprocates and rotates a crankshaft 18 of the engine 10. The burned air-fuel mixture is discharged from the combustion chamber 11 to a discharge passage 19 as exhaust gas.

The ignition timing controller includes an electronic control unit 30, which performs various types of control to operate the engine 10. The electronic control unit 30 has a central processing unit (CPU) carrying out various calculation procedures related to the various types of control, a non-volatile memory (a ROM) storing programs and data necessary for the calculation procedures, a volatile memory (a RAM 30a) temporarily storing calculation results of the CPU, and an input/output port through which signals are input or output with respect to the exterior.

Various types of sensors are connected to an input port of the electronic control unit 30. The sensors include, for example, an accelerator pedal sensor 31, a throttle sensor 32, and a knock sensor 33. The accelerator pedal sensor 31 detects the depression amount (an accelerator pedal depression amount AC) of an accelerator pedal 20. The throttle sensor 32 detects the opening degree (a throttle valve opening degree TA) of a throttle valve 21, which is arranged in the intake passage 12. The knock sensor 33 detects knocking in the engine 10. Other sensors are, for example, an air amount sensor 34, a crank sensor 35, and a driving switch 36. The air amount sensor 34 detects the amount of air (a passage air amount GA) passing through the intake passage 12. The crank sensor 35 detects the rotational speed (an engine speed NE) and the rotational angle (a crank angle) of the crankshaft 18. The driving switch 36 is manipulated when operation of the engine 10 is started or stopped.

The electronic control unit 30 acquires the operating state of the engine 10, such as the engine speed NE and an engine load KL, based on output signals from the sensors. The engine load KL is calculated based on the intake air amount of the engine 10 and the engine speed NE. The intake air amount and the engine speed NE are determined based on the accelerator pedal depression amount AC, the throttle valve opening degree TA, and the passage air amount GA. The electronic control unit 30 outputs a command signal to various types of driver circuits, which are connected to an output port, in accordance with the operating state of the engine 10. In this manner, the electronic control unit 30 performs various types of control such as ignition timing control of the engine 10.

The ignition timing controller includes a storage battery 22. The storage battery 22 is connected to an electric circuit (including the electronic control unit 30) for supplying the power to the engine 10 and peripheral devices of the engine 10. The power supply to the RAM 30a is maintained after the driving switch 36 is manipulated to stop operation of the engine 10. This maintains a value stored in the RAM 30a.

The ignition timing control of the engine 10 will now be explained with reference to FIG. 2.

In the present embodiment, the ignition timing of the engine 10 is controlled based on a control target value determined based on the operating state of the engine 10, which is, specifically, an ignition timing command value ST. Specifically, as the ignition timing command value ST becomes smaller, the ignition timing of the engine 10 becomes more retarded.

Figure 2:
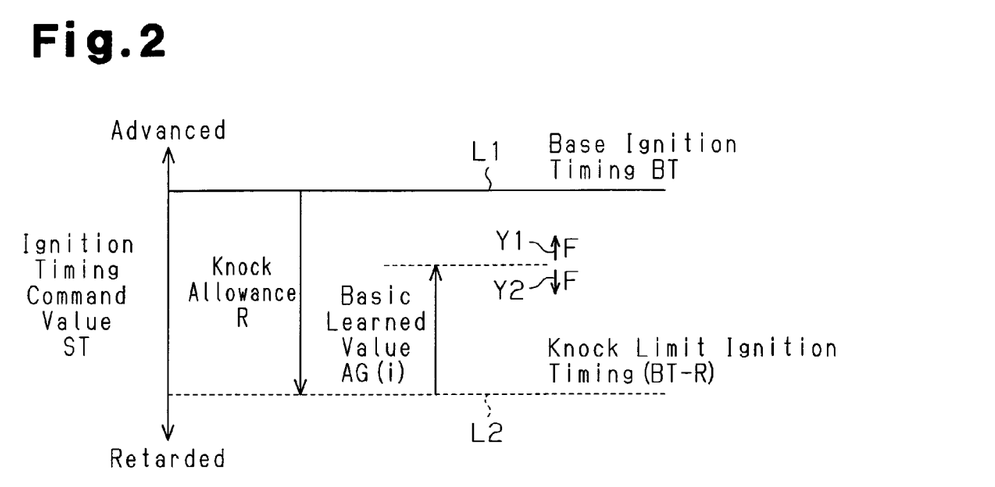
FIG. 2 is a diagram representing a procedure for calculating an ignition timing command value.

With reference to FIG. 2, the ignition timing command value ST is calculated basically by correcting a knock limit ignition timing (BT−R), which is determined based on the operating state of the engine 10, using a feedback correction term F, which is selectively increased and decreased depending on whether knocking has occurred, and a basic learned value AG(i), which is updated based on the feedback correction term F.

A value obtained by subtracting a knock allowance R from a base ignition timing BT (represented by the sold line L1) is used as the knock limit ignition timing (BT−R). The base ignition timing BT is a most advanced ignition timing that prevents knocking under standard environmental conditions. The base ignition timing BT is calculated based on the engine load KL and the engine speed NE. The knock allowance R is a fixed value set in advance by a test or the like.

The knock limit ignition timing (BT−R) is a value retarded from the base ignition timing BT by the amount corresponding to the knock allowance R (as represented by the broken line L2). In other words, the knock limit ignition timing (BT−R) is the most advanced timing of the range of the ignition timing that prevents knocking even under environmental conditions in which the knocking is most likely to occur. The aforementioned environmental conditions include the atmospheric temperature, the humidity, the atmospheric pressure, and the engine coolant temperature. In accordance with these conditions, the likelihood of the occurrence of knocking in the engine 10 varies. In the present embodiment, the knock limit ignition timing (BT−R) is a basic value.

When knocking occurs, in response to an output signal of the knock sensor 33, the amount corresponding to a retardation update amount a is subtracted from the feedback correction term F to retard the ignition timing. When knocking does not occur, the amount corresponding to an advance update amount b is added to the feedback correction term F to advance the ignition timing. That is, when knocking occurs, the feedback correction term F retards the ignition timing immediately so as to suppress the knocking. Contrastingly, when knocking does not occur, the feedback correction term F advances the ignition timing to increase the output of the engine 10.

Figure 3:
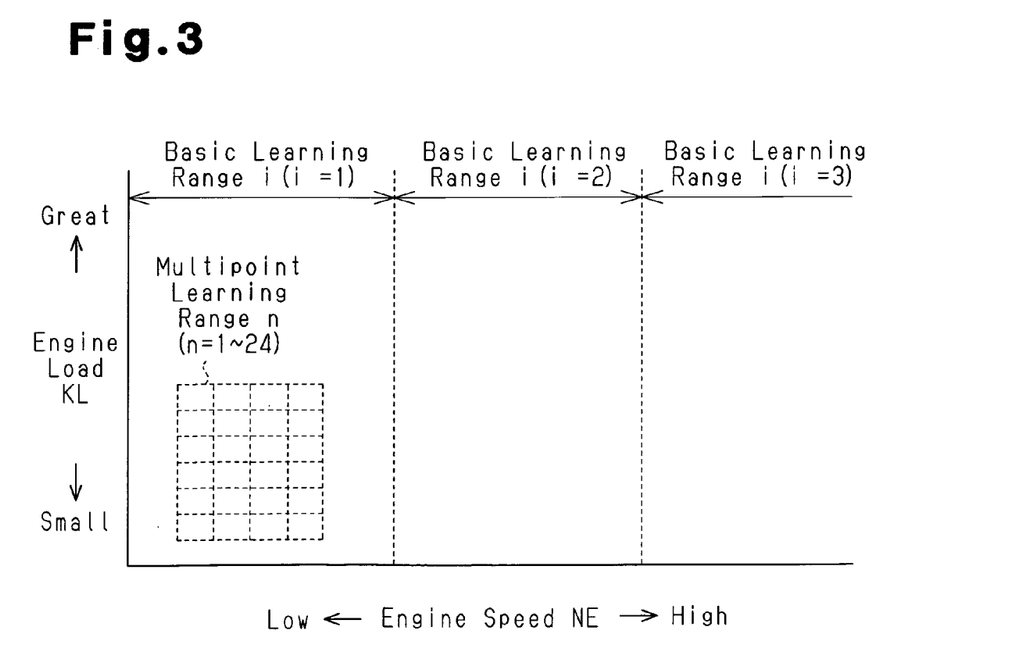
FIG. 3 is a diagram illustrating basic learning ranges and multipoint learning ranges.

The basic learned value AG(i) is set for each one of a plurality of basic learning ranges i (i=1, 2, 3) defined in correspondence with the engine operating state (the engine load KL and the engine speed NE). FIG. 3 illustrates the basic learning ranges i. With reference to FIG. 3, three basic learning ranges i (i=1, 2, 3) are set in correspondence with the engine speed NE. When the ignition timing command value ST is calculated, the value of one of the basic learning ranges i corresponding to the engine speed NE is used as the basic learned value AG(i). The basic learned value AG(i) is updated based on the tendency of change of the feedback correction term F. Specifically, a value obtained by subjecting the feedback correction term F to the gradual change procedure is stored as an update of the basic learned value AG(i) corresponding to the basic learning range i that is determined in correspondence with the engine speed NE. The basic learned value AG(i) constantly corrects the ignition timing (the ignition timing command value ST) so as to suppress knocking. The basic learned values AG(i) are stored in the RAM 30a of the electronic control unit 30. In the gradual change procedure, for example, the basic learned value AG(i) is calculated by the expression: AG(i)=[previous learned value x×(n−1)+ feedback correction term F]/n, in which the previous learned value represents a most recent update of the basic learned value AG(i) and n represents a positive number greater than or equal to 1.0.

With reference to FIG. 2, by correcting the knock limit ignition timing (BT−R) using the basic learned value AG(i), the ignition timing command value ST becomes advanced with respect to the knock limit ignition timing (BT−R). In this state, as represented by arrows Y1 or Y2 in FIG. 2, the ignition timing command value ST is increased or decreased by the feedback correction term F, depending on whether knocking has occurred. That is, the basic learned value AG(i) is updated by storing the value obtained by performing the gradual change procedure on the feedback correction term F as an update of the basic learned value AG(i).

When deposit forms in the combustion chamber 11 of the engine 10, causing time-dependent change of the engine 10, knocking is likely to occur. In this case, the basic learned value AG(i) is updated to decrease. The update amount of the basic learned value AG(i) corresponds to the amount by which the knocking limit of the ignition timing is retarded due to the time-dependent change of the engine 10. Accordingly, by correcting the ignition timing (the knock limit ignition timing (BT−R)) using the updated basic learned value AG(i), the knocking caused by the time-dependent change of the engine 10 is suppressed.

Even in the same basic learning range i, the time-dependent change of the engine 10 influences the knocking to greatly varied extents in segmented engine operating ranges of the range i. Accordingly, even if the ignition timing is corrected using only the basic learned value AG(i) set for each basic learning range i, the knocking caused by time-dependent change of the engine 10 may not be effectively suppressed, depending on the engine operating state in the corresponding basic learning range i. Specifically, if the basic learned value AG(i) is excessively large when the knocking is to be suppressed, the knocking cannot be suppressed effectively. If the basic learned value AG(i) is excessively small, the ignition timing is corrected to an excessively retarded timing, thus decreasing the power output of the engine 10.

In the present embodiment, the ignition timing command value ST is determined by the expression (1) shown below, using the knock limit ignition timing (BT−R), the feedback correction term F, and a total learned value AGT.

$$ST = (BT-R) + F + AGT \tag{1}$$

The total learned value AGT is calculated by the expression (2) shown below, using the basic learned value AG(i) and a multipoint learned value AGdp(n).

$$AGT = AG(i) + AGdp(n) \tag{2}$$

When deposit forms in the combustion chamber 11 and causes time-dependent change of the engine 10, the multipoint learned value AGdp(n) corrects the ignition timing (the ignition timing command value ST) in accordance with variation of the influence of time-dependent change of the engine 10 on the knocking. The multipoint learned values AGdp(n) are stored in the RAM 30a.

A plurality of multipoint learning ranges n are set in a range of the basic learning ranges i in which time-dependent change of the engine 10 influences the knocking to greatly varied extents. The multipoint learning ranges n are more segmented than the basic learning ranges i, which are defined in correspondence with the operating state of the engine 10. The multipoint learned values AGdp(n) are each set for the corresponding one of the multipoint learning ranges n.

In the multipoint learned values AGdp(n), the value corresponding to the multipoint learning range n including the operating state of the engine 10 is updated based on the feedback correction term F. Specifically, as in the case of updating the basic learned value AG(i), the multipoint learned value AGdp(n) is updated by storing a value obtained by subjecting the feedback correction term F to the gradual change procedure as a new value of the multipoint learned value AGdp(n).

Accordingly, even in the range in which the time-dependent change of the engine 10 influences the knocking to greatly varied extents, the multipoint learned values AGdp(n) of the multipoint learning ranges n, which are segmented in accordance with the varied extents, are used as values appropriate for suppressing the knocking.

In the present embodiment, when the operating state of the engine 10 is in any one of the multipoint learning ranges n, only the associated multipoint learned value AGdp(n) is updated without updating the basic learned value AG(i) of the basic learning range i corresponding to the multipoint learning range n. In other words, when the engine operating state corresponds to any one of the multipoint learning ranges n, only the multipoint learned value AGdp(n) is learned. When the engine operating state corresponds to a range other than the multipoint learning ranges n, only the basic learned value AG(i) is learned.

When the ignition timing command value ST is determined and the operating state of the engine 10 corresponds to any one of the multipoint learning ranges n, the value corresponding to the multipoint leaning range n including the engine operating state is used as the multipoint learned value AGdp(n). Contrastingly, when the operating state of the engine 10 does not correspond to any one of the multipoint learning ranges n, the multipoint learned value AGdp(n) is set to 0. In other words, when the current engine operating state does not correspond to any one of the multipoint learning ranges n, the ignition timing command value ST is calculated without employing the multipoint learned value AGdp(n), and correction of the ignition timing using the multipoint learned value AGdp(n) is not carried out.

By determining the ignition timing command value ST in the above described manner, the knock limit ignition timing (BT–R) is corrected using both the basic learned value AG(i) and the multipoint learned value AGdp(n) in the range (the multipoint learning ranges n) of the basic learning range i in which the time-dependent change of the engine 10 influences knocking to greatly varied extents.

Accordingly, even in the range of the basic learning range i in which the time-dependent change of the engine 10 influences knocking to greatly varied extents, steady knocking is reliably suppressed. In other words, the ignition timing is prevented from being corrected to an advanced timing with respect to an optimal timing and from thus hampering effective suppression of the knocking. Also, the ignition timing is prevented from being corrected to a retarded timing with respect to the optimal timing and from thus decreasing the power output of the engine 10. In the present embodiment, the procedure for calculating the ignition timing command value ST functions as setting means and permission means.

As illustrated in FIG. 3, the multipoint learning ranges n are set in a low range of the engine load KL in the basic learning range i (i=1) corresponding to the lowest range of the engine speed NE among the basic learning ranges i. In other words, the time-dependent change of the engine 10 influences the knocking to greatly varied extents in the aforementioned range in the basic learning range i (i=1). Specifically, four lines of the multipoint learning ranges n are aligned along the direction in which the engine speed NE changes, and six lines of the multipoint learning ranges n are aligned along the direction in which the engine load KL changes. A total of twenty-four multipoint learning ranges n (n=1 to 24) are thus set in this learning range. In the present embodiment, the multipoint learning ranges n each correspond to a first engine operating range and the multipoint learned values AGdp(n) each correspond to a first learned value. The range of the basic learning range i (i=1) other than the multipoint learning ranges n corresponds to a second engine operating state and the basic learned values AG(i) corresponding to the basic learning range i (i=1) each correspond to a second learned value.

The difference of change of the ignition timing command value ST between the multipoint learning ranges n and the range other than the multipoint learning ranges n in the basic learning range i (i=1), which corresponds to the lowest range of the engine speed NE, will now be described for a case with time-dependent change of the engine 10 and a case without the aforementioned change of the engine 10.

Figure 4:
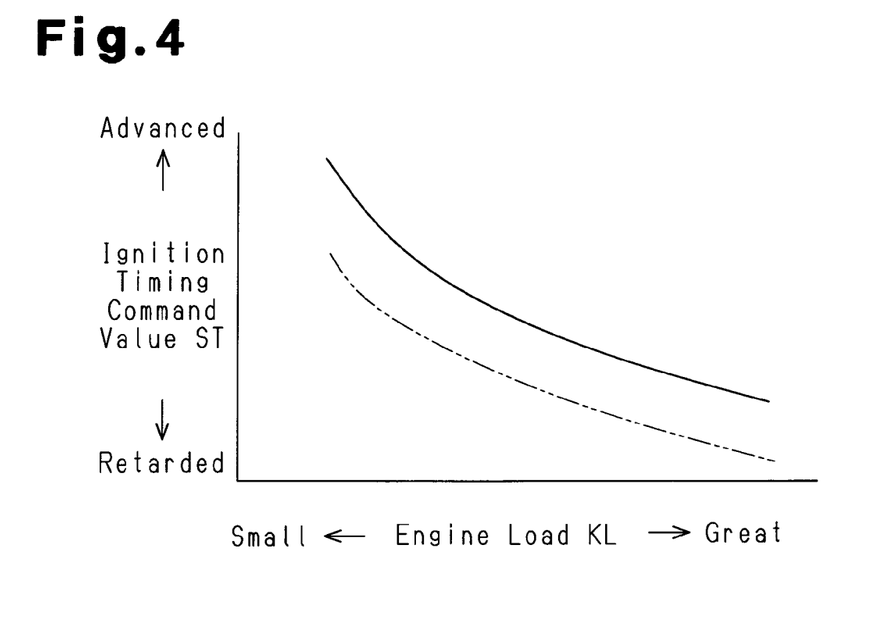
FIG. 4 is a graph showing an ignition timing command value, which is changed depending on whether there is time-dependent change of the engine.

FIG. 4 illustrates an example of change of the ignition timing command value ST in the range of the basic learning range i (i=1) other than the multipoint learning ranges n for a case where time-dependent change of the engine 10 exists and a case where no such change exists. In FIG. 4, the solid curve and the double-dotted chain curve both represent change of the ignition timing command value ST with respect to change of the engine load KL when the engine speed NE is constant. Specifically, the solid curve represents an example of change of the ignition timing command value ST without time-dependent change of the engine 10, and the double-dotted chain curve represents change of the ignition timing command value ST with time-dependent change of the engine 10.

With reference to FIG. 4, in the range of the basic learning range i (i=1) other than the multipoint learning ranges n, when time-dependent change of the engine 10 exists and knocking occurs easily, the ignition timing command value ST shifts to the retarded side from the state indicated by the solid curve to the state indicated by the double-dotted chain curve. In this case, the difference between the ignition timing command value ST indicated by the solid curve and the ignition timing command value ST indicated by the chain curve is constant along the direction in which the engine load KL changes. To suppress knocking caused by time-dependent change of the engine 10, the amount by which the ignition timing command value ST is retarded corresponds to the amount by which the basic learned value AG(i) is retarded. In the range of the basic learning range i (i=1) other than the multipoint learning ranges n, knocking, which is easily caused by the time-dependent change of the engine 10, is suppressed by correcting the ignition timing using the basic learned value AG(i). Specifically, the time-dependent change of the engine 10 influences the knocking substantially in a constant manner throughout the aforementioned range of the basic learning range i (i=1).

Figure 5:
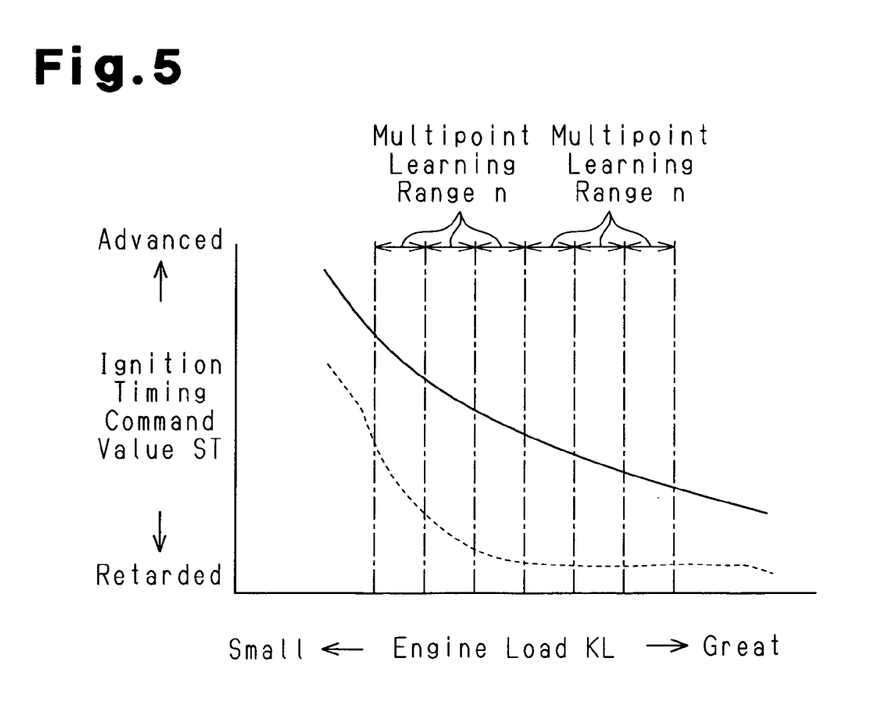
FIG. 5 is a graph showing an ignition timing command value, which is changed depending on whether there is time-dependent change of the engine.

FIG. 5 represents change of the ignition timing command value ST in the range of the basic learning range i (i=1) corresponding to the multipoint learning ranges n (which is, for example, the range corresponding to the multipoint learning ranges n (n=1 to 6)), for a case where time-dependent change of the engine 10 exists and a case where change of the engine 10 does not exist. In FIG. 5, the solid curve and the double-dotted chain curve both represent the change of the ignition timing command value ST with respect to the change of the engine load KL when the engine speed NE is constant. Specifically, the solid curve represents an example of the change of the ignition timing command value ST without time-dependent change of the engine 10. The broken curve represents an example of the change of the ignition timing command value ST with time-dependent change of the engine 10.

With reference to FIG. 5, in the multipoint learning ranges n of the basic learning range i (i=1), when the time-dependent change of the engine 10 and knocking occurs easily, the ignition timing command value ST is retarded from the state indicated by the solid curve to the state indicated by the broken curve. In this case, the difference between the ignition timing command value ST indicated by the solid curve and the ignition timing command value ST indicated by the chain curve is varied as the engine load KL changes. To suppress knocking caused by time-dependent change of the engine 10, the amount by which the ignition timing command value ST is retarded includes not only the amount by which the basic learned value AG(i) is retarded but also the amount by which the multipoint learned value AGdp(n) is retarded.

In the present embodiment, knocking caused by time-dependent change of the engine 10 is suppressed by correcting the ignition timing using the multipoint learned value AGdp(n) in the multipoint learning ranges n of the basic learning range i (i=1). Specifically, even if the time-dependent change of the engine 10 influences knocking to greatly varied extents for the respective multipoint learning ranges n, the multipoint learned values AGdp(n), which are set for the respective multipoint learning ranges n segmented with such varied extents of the influence taken into consideration, are each updated to such a value that the knocking is appropriately suppressed. The ignition timing is then corrected using the multipoint learned values AGdp(n).

In the multipoint learning ranges n (see FIG. 3), time-dependent change of the engine 10 influences knocking to a greater extent as the engine speed NE decreases. Such influence is maximized in a range of the multipoint learning ranges n that includes a specific value of the engine load KL (which is, for example, the median value of the engine load KL with all of the multipoint learning ranges n included) and becomes smaller as the engine load KL becomes more separate from this range. Accordingly, the multipoint learned values AGdp(n) are smaller in those of the multipoint learning ranges n located in the low speed range of the engine 10 and in ranges closer to the multipoint learning range n including the specific engine load KL.

As has been described, if, for example, high-octane gasoline is fed to the fuel tank 14 that has retained regular fuel, the fuel received by the engine 10 has properties different from the properties of the originally retained fuel. In this case, the occurrence state of knocking changes, and the feedback correction term F greatly changes.

Accordingly, if fuel having different properties is fed to the fuel tank 14 in the above described manner, the following problem is caused by switching, in accordance with the operating state of the engine 10, the learning of the multipoint learned value AGdp(n) between a permitted state and a prohibited state (the state in which the basic learned value AG(i) is learned). Specifically, immediately after refueling, the ignition timing (the feedback correction term F) is greatly changed by the different properties of the fuel when the engine 10 operates in any multipoint learning range n. The greatly changed ignition timing is reflected in the multipoint learned value AGdp(n), which is used for compensating for the amount by which the ignition timing is changed due to time-dependent change of the engine 10 (the varied influence of the time-dependent change of the engine 10 on the ignition timing). This hinders accurate learning of the basic learned value AG(i) and the multipoint learned value AGdp(n) in correspondence with the target of compensation.

To solve this problem, in the present embodiment, it is determined whether there is a possibility that fuel has been fed to the fuel tank 14. When it is determined that it is likely that the fuel has been fed, the learning of the multipoint learned value AGdp(n) is prohibited for a subsequent predetermined period of time.

A learning procedure, including a procedure (a prohibiting procedure) for prohibiting the learning of the multipoint learned value AGdp(n), will hereafter be explained with reference to FIG. 6.

Figure 6:
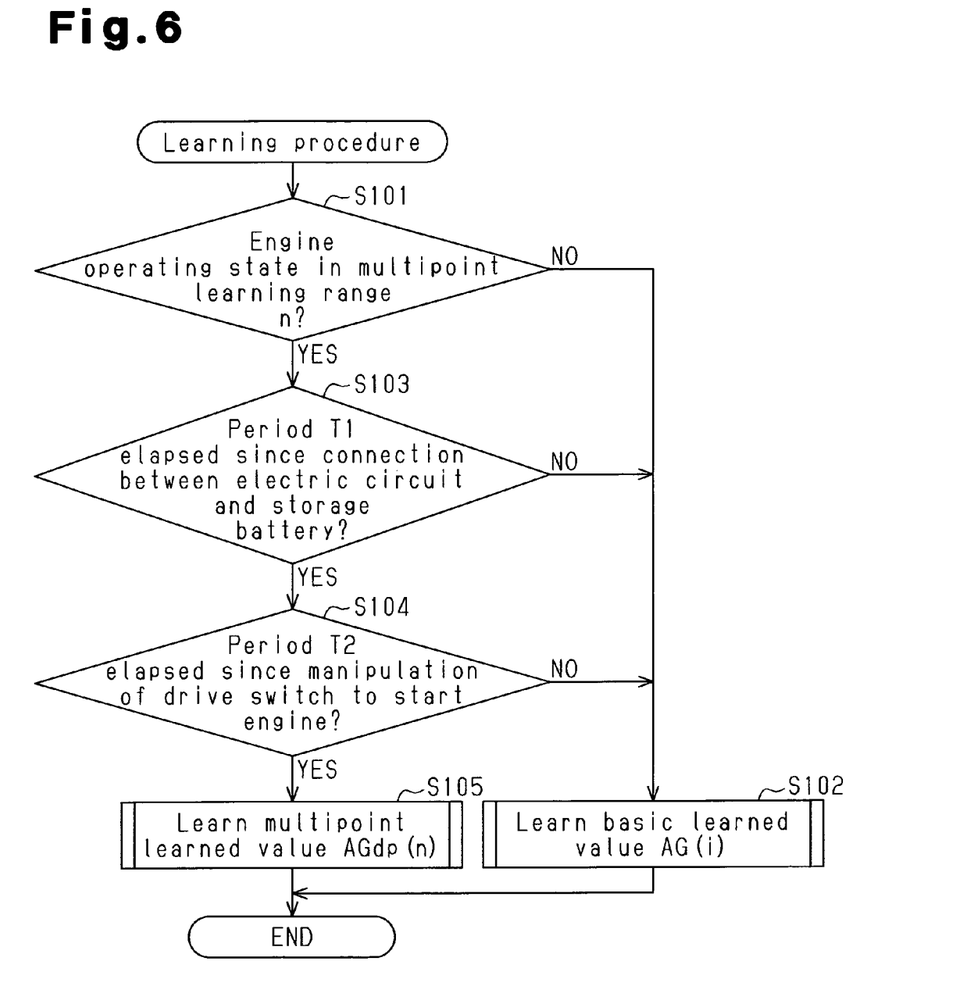
FIG. 6 is a flowchart representing specific steps of a learning procedure.

FIG. 6 is a flowchart representing the specific steps of the learning procedure. A series of processes represented by the flowchart is performed by the electronic control unit 30 at predetermined crank angles as an interrupting procedure.

As illustrated in FIG. 6, in the learning procedure, it is first determined whether the engine operating state is in any one of the multipoint learning ranges n (step S101). When the engine operating state is not in any one of the multipoint learning ranges n (step S101: NO), the basic learned value AG(i) is learned (step S102) and the procedure is suspended.

Contrastingly, when the engine operating state is in any one of the multipoint learning ranges n (step S101: YES), it is determined whether a predetermined period T1 has elapsed since connection of the storage battery 22 to an electric circuit, which is, specifically, attachment of a power supply cable to a terminal of the storage battery 22 (step S103). The electronic control unit 30 (the RAM 30a) stores count number (trip number, initial value=0), with one count defined as a period from when the driving switch 36 is manipulated to start the engine 10 to when the driving switch 36 is manipulated to stop the engine 10. In step S103, it is determined that the predetermined period T1 has elapsed when the trip number stored in the electronic control unit 30 is greater than or equal to a predetermined value (in the present embodiment, 1).

If it is determined that the predetermined period T1 has elapsed since the storage battery 22 was connected to the electric circuit (step S103: YES), it is determined whether a predetermined period T2 has elapsed since manipulation of the driving switch 36 to start the engine 10 (step S104). Specifically, if the learning procedure has been performed repeatedly for a predetermined number of times (for example, ten times), it is determined that the predetermined period T2 has elapsed.

When it is determined that the predetermined period T2 has elapsed since the driving switch 36 was manipulated to start the engine 10 (step S104: YES), the multipoint learned value AGdp(n) of the multipoint learning range n corresponding to the current engine operating state is learned (step S105). The learning procedure is then suspended. In the present embodiment, step S103 and step S104 correspond to determination means and prohibition means.

Contrastingly, if the predetermined period T1 has not yet elapsed since connection of the storage battery 22 to the electric circuit (step S103: NO) or the predetermined period T2 has not yet elapsed since manipulation of the driving switch 36 to start the engine 10 (step S104: NO), the basic learned value AG(i) of the basic learning range i (i=1) corresponding to the multipoint learning range n is learned (step S102). The learning procedure is then suspended.

The learning procedure of the present embodiment has the following advantages.

There may be a case in which fuel is fed to the fuel tank 14 after the engine 10 has been repaired or inspected. Normally, before such repair or inspection, the electric circuit, which powers the engine 10 and the peripheral devices of the engine 10, is disconnected from the storage battery 22. When the repair or the inspection is finished, the electric circuit and the storage battery 22 are reconnected to each other. Accordingly, such reconnection between the electric circuit and the storage battery 22 may indicate the possibility that fuel has been fed to the fuel tank 14.

Also, fuel is supplied to the fuel tank 14 normally with the engine 10 held in a stopped state. Accordingly, it is possible that the fuel has been supplied to the fuel tank 14 immediately before the engine 10 is restarted.

In the present embodiment, if the engine operating state corresponds to any one of the multipoint learning ranges n and the predetermined period T1 has not elapsed since connection between the electric circuit and the storage battery 22 (step S103: NO), the basic learned value AG(i) corresponding to the basic learning range i (i=1) including the multipoint learning range n is learned. In this case, since the connection between the electric circuit and the storage battery 22 indicates the possibility that the fuel has been supplied to the fuel tank 14, it is determined that there is a possibility that the engine 10 receives fuel having properties greatly different from the properties of the originally retained fuel. As a result, the learning of the multipoint learned value AGdp(n) is prohibited for the predetermined period T1 and the learning of the basic learned value AG(i) is carried out preferentially.

Similarly, when the predetermined period T2 has not elapsed since manipulation of the driving switch 36 to start the engine 10 (step S104: NO), the basic learned value AG(i) corresponding to the basic learning range i (i=1) including the multipoint learning range n is learned. Also in this case, since the manipulation of the driving switch 36 to start the engine 10 indicates the possibility that the fuel has been fed to the fuel tank 14, it is determined that there is a possibility that the engine 10 receives fuel having properties greatly different from the properties of the originally retained fuel. As a result, the learning of the multipoint learned value AGdp(n) is prohibited for the predetermined period T2 and the learning of the basic learned value AG(i) is carried out preferentially.

By performing the above described learning procedure, the learning of the multipoint learned value AGdp(n) is prohibited for the predetermined period of time in which the feedback correction term F is greatly changed by the fuel having properties different from the properties of the originally retained fuel, which is supplied to the engine 10. This prevents the change amount of the ignition timing caused by the different properties of the fuel from being reflected in the multipoint learned value AGdp(n).

In this period, the learning of the basic learned value AG(i) is permitted. The change amount of the ignition timing caused by the different properties of the fuel is reflected in the basic learned value AG(i). Accordingly, the basic learned value AG(i) compensates for the change amount of the ignition timing caused by the different properties of the fuel in the multipoint learning ranges n and the ranges other than the multipoint learning ranges n.

Particularly, in the present embodiment, the basic learned value AG(i) is learned based on the feedback correction term F in the multipoint learning ranges n when the learning of the multipoint learned value AGdp(n) is prohibited. Accordingly, unlike a comparative case in which the basic learned value AG(i) is not learned in the period (the predetermined period T1 or T2) in which updating of the multipoint learned value AGdp(n) is prohibited, the change amount of the ignition timing caused by the different properties of the fuel fed to the engine 10 is reflected in the basic learned value AG(i) at an early stage.

Further, after a predetermined period, or in other words, after the basic learned value AG(i) is learned, the multipoint learned value AGdp(n) of the multipoint learning range n is learned. Accordingly, when the ignition timing is changed by the time-dependent change of the engine 10, the change amount of the ignition timing is reflected in the multipoint learned value AGdp(n). As a result, the multipoint learned value AGdp(n) compensates for the change amount of the ignition timing caused by the time-dependent change of the engine 10.

In the present embodiment, at refueling, the basic learned value AG(i) and the multipoint learned value AGdp(n) are both learned appropriately in correspondence with change of the target of compensation. This ensures appropriate learning of the ignition timing.

In the present embodiment, once the electric circuit and the storage battery 22 are disconnected from each other, the values stored in the RAM 30a of the electronic control unit 30 are deleted. In other words, the basic learned values AG(i) and the multipoint learned values AGdp(n), which have been learned by that time, are deleted. As a result, after the electric circuit and the storage battery 22 are reconnected, it takes a long time to learn the basic learned value AG(i) corresponding to the basic learning range i (i=1) in such a manner that the basic learned value AG(i) becomes a value corresponding to the actual condition (specifically, a value corresponding to the properties of the fuel supplied to the engine 10). Contrastingly, with the electric circuit and the storage battery 22 connected to each other, if the driving switch 36 is manipulated to switch between activation and deactivation of the engine 10, the basic learned values AG(i) and the multipoint learned values AGdp(n) are maintained in the RAM 30a of the electronic control unit 30 without being deleted. This comparatively shortens the time necessary for learning the basic learned value AG(i) corresponding to the basic learning range i (i=1) in such a manner that the basic learned value AG(i) becomes the value corresponding to the actual condition.

In the present embodiment, when the driving switch 36 is manipulated to start the engine 10 or when the storage battery 22 is connected to the electric circuit (step S103: NO or step S104: NO), it is determined that there is a possibility that fuel has been fed to the fuel tank 14.

After the storage battery 22 is connected to the electric circuit, the learning of the multipoint learned value AGdp(n) is prohibited and the learning of the basic learned value AG(i) is carried out preferentially for a predetermined period (the period T1) until the number of manipulation of the driving switch 36 to stop the engine 10 reaches a predetermined number (in the present embodiment, one time).

After the number of manipulation of the driving switch 36 exceeds the predetermined number, each time the driving switch 36 is manipulated to start the engine 10, the learning of the multipoint learned value AGdp(n) is prohibited and the learning of the basic learned value AG(i) is carried out preferentially for a predetermined period (the period T2) from when the driving switch 36 has been manipulated to when the number of updates of the basic learned value AG(i) reaches a predetermined number.

In this manner, when the storage battery 22 is connected to the electric circuit, or in other words, when it takes a long time to learn the basic learned values AG(i) corresponding to the basic learning range i (i=1), a long time is set as the predetermined period T1 based on the time points at which the driving switch 36 is manipulated to stop the engine 10, which are separated by long time intervals. Accordingly, the basic learned value AG(i) is learned preferentially for a long period of time. As a result, the basic learned value AG(i) is learned accurately in correspondence with the actual condition.

When the driving switch 36 is manipulated to start the engine 10 after the number of manipulation of the driving switch 36 exceeds the predetermined number, or in other words, when it takes a comparatively short time to learn the basic learned value AG(i), the short time is set as the predetermined period T2 based on the time points at which the basic learned value AG(i) is updated, which are separated by short time intervals (cycles at which the learning procedure is carried out). Accordingly, the learning accuracy of the basic learned value AG(i) is maintained high and the learning, which is performed preferentially, is accomplished at an early stage. As a result, the learning of the multipoint learned value AGdp(n) is started at an early stage.

If the operating state of the engine 10 is in the basic learning range i (i=1), which corresponds to the lowest range of the engine speed NE, the basic learned value AG(i) corresponding to the basic learning range i (i=1) is updated and changed based on the feedback correction term F. Afterwards, when the engine operating state is switched to any one of the multipoint learning ranges n, the change of the basic learned value AG(i) adversely influences the ignition timing (the ignition timing command value ST). As made clear by the expressions (1) and (2), this problem is caused by the fact that the ignition timing command value ST in the multipoint learning range n is calculated based on the total learned value AGT, which is the sum of the basic learned value AG(i) and the multipoint learned value AGdp(n). Such change of the ignition timing may cause the ignition timing to become an inappropriate timing for suppressing knocking and lower the power output of the engine 10. To solve this problem, a reflection procedure is performed in the present embodiment, as hereafter will be explained in detail.

The reflection procedure will now be described with reference to FIG. 7.

Figure 7:
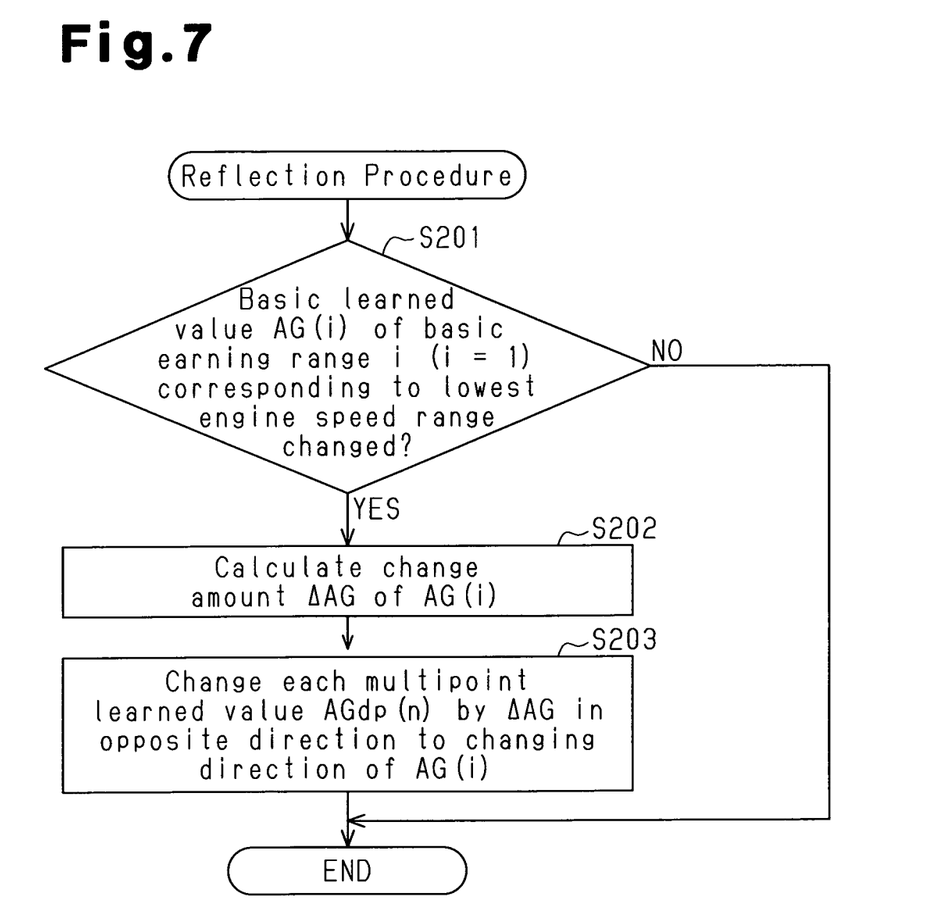
FIG. 7 is a flowchart representing specific steps of a reflection procedure.

FIG. 7 is a flowchart representing the specific steps of the reflection procedure. A series of processes represented by the flowchart is performed by the electronic control unit 30 as an interrupting procedure at predetermined crank angles.

With reference to FIG. 7, in the reflection procedure, it is first determined whether the basic learned value AG(i) in the basic learning range i (i=1), which corresponds to the lowest range of the engine speed NE, has changed (step S201). Specifically, if a value A, which is the basic learned value AG(i) from the previous cycle of the reflection procedure, is different from a value B, which is the basic learned value AG(i) of the current cycle, it is determined that the basic learned value AG(i) has changed.

When it is determined that the basic learned value AG(i) has changed (step S201: YES), a change amount ΔAG (ΔAG=B−A) of the basic learned value AG(i) is calculated (step S202) and the multipoint learned value AGdp(n) of the multipoint learned value n is changed by the amount corresponding to the change amount LAG in the opposite direction to the changing direction of the basic learned value AG(i) (step S203). The reflection procedure is then suspended.

Contrastingly, when it is determined that the basic learned value AG(i) has not changed (step S201: NO), the reflection procedure is suspended without changing the multipoint learned value AGdp(n), skipping steps S202 and S203.

Figure 8A:
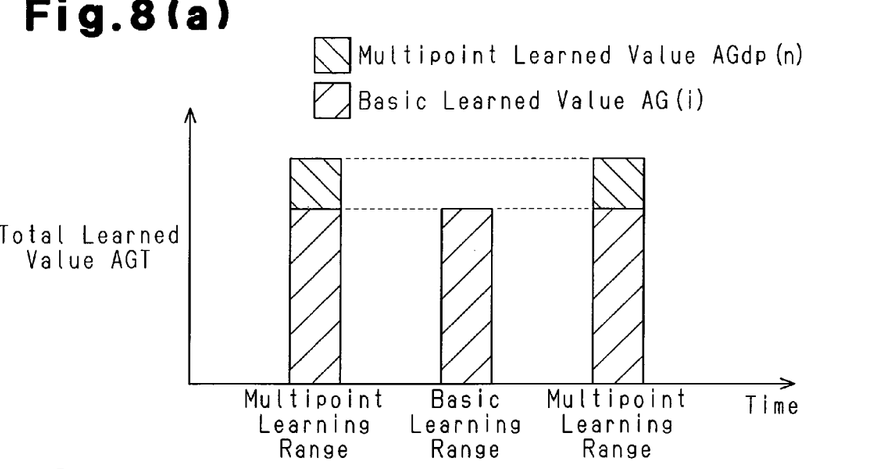
FIGS. 8(a), 8(b), and 8(c) are diagrams each representing an example of change of a total learned value.
Figure 8B:
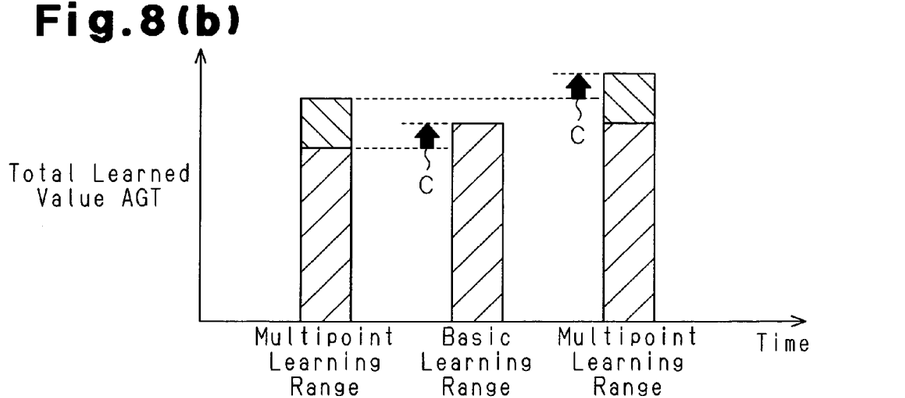
Figure 8C:
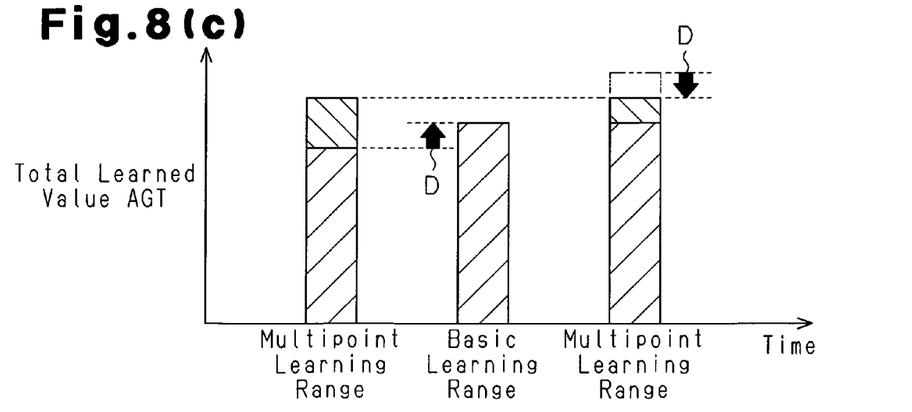

FIGS. 8(a), 8(b), and 8(c) each represent change of the total learned value AGT when the operating state of the engine 10 is switched from the multipoint learning range n to the basic learning range i (i=1), then to the multipoint learning range n. FIG. 8(a) corresponds to a case in which the basic learned value AG(i) substantially does not change. FIG. 8(b) corresponds to a case in which the basic learned value AG(i) changes and the reflection procedure is not carried out. FIG. 8(c) corresponds to a case in which the basic learned value AG(i) changes and the reflection procedure is carried out.

In the case represented by FIG. 8(a), there is substantially no difference between the previous value and the current value of the total learned value AGT in the multipoint leaning range n, despite the aforementioned switching of the operating state of the engine 10.

In the case represented by FIG. 8(b), where the reflection procedure is not performed, the current value and the previous value of the total learned value AGT in the multipoint learning range n of the engine operating state are different from each other by the amount corresponding to the change amount of the basic learned value AG(i) represented by arrow C.

In the present embodiment, when the basic learned value AG(i) in the basic learning range i (i=1) is updated to a greatly different value, the reflection procedure is performed. In other words, as illustrated in FIG. 8(c), the multipoint learned value AGdp(n) of the multipoint learning range n is changed by the amount corresponding to the change amount of the basic learned value AG(i) indicated by arrow D in the opposite direction to the changing direction of the basic learned value AG(i).

By changing the multipoint learned values AGdp(n) by the amount corresponding to the change amount of the basic learned value AG(i) in the above described manner, the change of the basic learned value AG(i) is prevented from influencing the ignition timing when the operating state of the engine 10 is switched to the multipoint learning range n after the basic learned value AG(i) has changed. In other words, the total learned value AGT calculated based on the multipoint learning range n and the ignition timing ST are maintained constant before and after the basic learned value AG(i) changes. Accordingly, when the ignition timing command value ST is calculated for the first time after the basic learned value AG(i) has changed and the engine operating state has been switched to the multipoint leaning range n, the ignition timing command value ST is prevented from becoming an inappropriate value for suppressing knocking or being excessively retarded and thus decreasing the engine power output due to the change amount of the basic learned value AG(i).

If the change amount of the feedback correction term F, which should be learned as the basic learned value AG(i), is erroneously learned as the multipoint learned value AGdp(n), the erroneously learned value is switched to the basic learned value AG(i) when the basic learned value AG(i) is learned. Accordingly, as the basic learned value AG(i) and the multipoint learned value AGdp(n), the values corresponding to the target of compensation are learned accurately and at an early stage.

If only the reflection procedure is performed without carrying out the prohibition procedure, the basic learned value AG(i) of the basic learning range i cannot be learned as long as the operating state of the engine 10 is maintained in the multipoint learning ranges n. This delays the learning of the basic learned value AG(i). However, in the present embodiment, the prohibition procedure is performed in addition to the reflection procedure. Accordingly, when the operating state of the engine 10 is in any multipoint learning range n and the learning of the multipoint learned value AGdp(n) is prohibited, the basic learned value AG(i) of the basic learning range i (i=1), which corresponds to the lowest range of the engine speed NE, is learned. As a result, compared to the case in which the basic learned value AG(i) is not learned, a value (a value corresponding to the different properties of the fuel supplied to the engine 10) corresponding to the target of compensation is learned as the basic learned value AG(i) at an early stage.

The present embodiment has the advantages described below.

(1) When it is determined that there is a possibility that fuel has been fed to the fuel tank 14, the learning of the multipoint learned value AGdp(n) is prohibited for the subsequent predetermined period. This prevents the change amount of the ignition timing caused by the fuel having properties different from the properties of the originally retained fuel from being reflected in the multipoint learned value AGdp(n). In this state, in order to permit the learning of the basic learned value AG(i), the change amount of the ignition timing caused by the fuel having different properties is reflected in the basic learned value AG(i). The basic learned value AG(i) thus compensates for the aforementioned change amount of the ignition timing in both the multipoint learning ranges n and the ranges other than the multipoint learning ranges n. Further, since the multipoint learned value AGdp(n) in the multipoint learning ranges n is learned after the predetermined period, the change amount of the ignition timing caused by the time-dependent change of the engine 10 is reflected in the multipoint learned value AGdp(n) if such change of the ignition timing has occurred. Accordingly, the multipoint learned value AGdp(n) compensates for the change amount of the ignition timing caused by the time-dependent change of the engine 10. This ensures appropriate learning of the engine ignition timing after refueling.

(2) When the learning of the multipoint learned value AGdp(n) is prohibited, the basic learned value AG(i) is learned based on the feedback correction term F in the multipoint learning ranges n. Accordingly, compared to the case in which the basic learned value AG(i) is not learned when updating of the multipoint learned value AGdp(n) is prohibited, the change amount of the ignition timing caused by the different properties of the fuel supplied to the engine 10 is reflected in the basic learned value AG(i) at an early stage.

(3) The multipoint learning ranges n are set in accordance with the operating state of the engine 10 and the multipoint learned values AGdp(n) are set for the corresponding multipoint learning ranges n. Specifically, the multipoint learning ranges n are defined by dividing the range in which the time-dependent change of the engine 10 influences knocking to greatly varied extents into small ranges in accordance with the varied extents of the influence. The multipoint learned value AGdp(n) of each of the multipoint learning ranges n is used as a value appropriate for suppressing the knocking. This prevents learning of an inappropriate value as the multipoint learned value AGdp(n), which hampers effective suppression of the knocking and decreases the engine power output, from being carried out.

(4) When the basic learned value AG(i) of the basic learning range i (i=1) corresponding to the lowest range of the engine speed NE changes, the multipoint learned value AGdp (n) of each multipoint learning range n is changed by the amount corresponding to the change amount LAG of the basic learned value AG(i) in the opposite direction to the changing direction of the basic learned value AG(i). In this manner, when the operating state of the engine 10 is switched to any one of the multipoint learning ranges n after the basic learned value AG(i) has changed, the change of the basic learned value AG(i) does not influence the ignition timing. Accordingly, when the ignition timing command value ST is calculated for the first time after the basic learned value AG(i) has changed and the engine operating state has been switched to any multipoint learning range n, the ignition timing command value ST is prevented from becoming an inappropriate value for suppressing knocking or being excessively retarded and thus decreasing the engine power output due to the change amount of the basic learned value AG(i).

(5) When the driving switch 36 is manipulated to start the engine 10, it is determined that there is a possibility that fuel has been supplied to the fuel tank 14.

(6) When the storage battery 22 is connected to the electric circuit that supplies the power to the engine 10 and the peripheral devices of the engine 10, it is determined that it is likely that fuel has been fed to the fuel tank 14.

(7) When the storage battery 22 is connected to the electric circuit, or in other words, when it takes a long time to learn the basic learned value AG(i) corresponding to the basic learning range i (i=1), long time is set as the predetermined period T1 based on the time points at which the driving switch 36 is manipulated to stop the engine 10, which are separated by long time intervals. Accordingly, the basic learned value AG(i) is learned preferentially for a long period of time. As a result, the basic learned value AG(i) is learned accurately in correspondence with the actual condition. When the driving switch 36 is manipulated to start the engine 10 after the number of manipulation of the driving switch 36 exceeds a predetermined number, or in other words, when it takes a comparatively short time to learn the basic learned value AG(i) corresponding to the basic learning range i (i=1), the short time is set as the predetermined period T2 based on the time points at which the basic learned value AG(i) is updated, which are separated by short time intervals. Accordingly, the learning accuracy of the basic learned value AG(i) is maintained high and such learning, which is performed preferentially, is accomplished at an early stage. As a result, the learning of the multipoint learned value AGdp(n) is started at an early stage.

The present embodiment may be modified to the following forms.

The number of the basic learning ranges i may be changed to any suitable number.

The number of the multipoint learning ranges n or the manner in which the multipoint learning ranges n are defined may be changed in any suitable manners.

When the learning of the multipoint learned value AGdp(n) is prohibited and the operating state of the engine 10 is in any one of the multipoint learning ranges n, the basic learned value AG(i) does not necessarily have to be learned.

The predetermined periods T1 and T2 may be modified in any suitable manners. For example, it may be determined that the predetermined period T1 (T2) has elapsed when the number of execution of the learning procedures or the number of ignition by a spark plug 16 exceeds a predetermined number or the elapsed time exceeds a predetermined period.

Either one of steps S103 or S104 may be omitted.

The condition for determining whether fuel has been fed to the fuel tank 14 may be changed in any suitable manner. For example, the condition may be that the lid of the fuel tank 14 has been opened and then closed or that the fuel amount in the fuel tank 14 has increased.

The invention claimed is:

1. An ignition timing controller of an internal combustion engine, the controller setting a control target value of ignition timing by correcting a basic value set based on an operating state of the engine using a feedback correction term updated depending on whether knocking has occurred and a learned value updated based on the feedback correction term, the controller learning a first learned value and a second learned value separately, the first learned value compensating for a change amount of the ignition timing caused by time-dependent change of the engine, and the second learned value compensating for a change amount of the ignition timing caused by a factor other than the time-dependent change of the engine each as the learned value separately from each other, the controller comprising:

setting means that sets the control target value by correcting the basic value using the first learned value and the second learned value in a first engine operating range, in which the time-dependent change of the engine influences the ignition timing to a great extent, wherein the setting means sets the control target value by correcting the basic value using only the second learned value in a second engine operating range, in which the time-dependent change of the engine influences the ignition timing to a small extent;

permission means that permits only learning of the first learned value in the first engine operating range, and permits only learning of the second learned value in the second engine operating range;

determination means that determines whether there is a possibility that fuel has been fed to a fuel tank that retains fuel to be supplied to the engine; and prohibition means that prohibits the learning of the first learned value for a predetermined period after the determination means determines that there is a possibility that fuel has been fed to the fuel tank.

2. The ignition timing controller according to claim 1, wherein when the prohibition means prohibits the learning of the first learned value, the second learned value is learned in the first engine operating range based on the feedback correction term.

3. The ignition timing controller according to claim 1, wherein the first engine operating range includes a plurality of multipoint learning ranges that are defined in accordance with the operating state of the engine, the first learned value being set for each one of the multipoint learning ranges, and wherein the ignition timing controller updates the first learned value of one of the multipoint learning ranges that includes the current engine operating state.

4. The ignition timing controller according to claim 1, wherein when the second learned value changes, the first learned value is changed by the amount corresponding to the change amount of the second learned value in the opposite direction to the changing direction of the second learned value.

5. The ignition timing controller according to claim 1, wherein on condition that a driving switch has been manipulated to start operation of the engine, the determination means determines that there is a possibility that fuel has been supplied to the fuel tank.

6. The ignition timing controller according to claim 1, wherein on condition that a storage battery is connected to an electric circuit for supplying power to the engine and peripheral devices of the engine, the determination means determines that there is a possibility that fuel has been fed to the fuel tank.

7. The ignition timing controller according to claim 1, wherein the second learned value is updated by a learning procedure performed at predetermined cycles and stored in a volatile memory, wherein, when a driving switch has been manipulated to start operation of the engine or when a storage battery is connected to an electric circuit for supplying power to the engine and peripheral devices of the engine, the determination means determines that there is a possibility that fuel has been fed to the fuel tank, and wherein the predetermined period corresponds to a period until the number of manipulation of the driving switch to stop the operation of the engine reaches a predetermined number after it has been determined that the storage battery is connected to the electric circuit, and wherein, after the number of manipulation of the driving switch to stop the operation of the engine has exceeded the predetermined number, the predetermined period corresponds to a period from when the driving switch is manipulated to start the operation of the engine to when the number of execution of the learning procedure reaches a predetermined number.

8. The ignition timing controller according the claim 1, wherein when a driving switch has been manipulated to start operation of the engine or when a storage battery is connected to an electric circuit for supplying power to the engine and peripheral devices of the engine, the determination means determines that there is a possibility that fuel has been fed to the fuel tank.

9. The ignition timing controller according the claim 1, wherein the second learned value is updated by a learning procedure performed at predetermined cycles, wherein the predetermined period corresponds to a period until the number of manipulation of the driving switch to stop the operation of the engine reaches a predetermined number after it has been determined that the storage battery is connected to the electric circuit, and wherein after the number of manipulation of the driving switch to stop the operation of the engine has exceeded the predetermined number, the predetermined period corresponds to a period from when the driving switch is manipulated to start the operation of the engine to when the number of execution of the learning procedure reaches a predetermined number.

* * * * *